United States Patent [19]

Lacey et al.

[11] Patent Number: 5,777,740
[45] Date of Patent: Jul. 7, 1998

[54] COMBINED INTERFEROMETER/ POLARIMETER

[75] Inventors: Christopher A. Lacey; Kenneth H. Womack, both of San Diego, Calif.

[73] Assignee: Phase Metrics, San Diego, Calif.

[21] Appl. No.: 807,669

[22] Filed: Feb. 27, 1997

[51] Int. Cl.[6] .................................................. G01B 9/02
[52] U.S. Cl. ................................. 356/357; 356/360
[58] Field of Search ............................ 356/345, 351, 356/355, 357, 359, 360; 360/75, 77.2

[56] References Cited

U.S. PATENT DOCUMENTS 5,583,639  12/1996  Rostvall ........................... 356/359

OTHER PUBLICATIONS

Journal of Modern Optics, 1991, vol. 38, No. 5, 889–896 (no date available).

Primary Examiner—Frank G. Font
Assistant Examiner—Robert Kim
Attorney, Agent, or Firm—Blakely Sokoloff Taylor & Zafman

[57] ABSTRACT

An apparatus and method for measuring the topographic profile of a reflective member having an index of refraction. The apparatus comprises a first optical system that reflects a light beam from the reflective member and detects the reflected light beam. A second optical system directs the light beam to interfere with the reflected light beam and detects the resulting interference pattern. A processor coupled to the first optical system and the second optical system computes the index of refraction of the reflective member from the detected reflected light beam and provides the topographic profile of the reflective member from the index of refraction and the interference pattern.

14 Claims, 5 Drawing Sheets

COMBINED INTERFEROMETER/ POLARIMETER

BACKGROUND OF THE INVENTION

1. Field Of The Invention

The present invention relates to an instrument for measuring the topography of surfaces.

2. Description Of Related Art

Hard disk drives contain a magnetic transducer(s) that magnetizes and senses the magnetic field of a flat rotating disk. The magnetic transducer is integrated into sliders that are typically assembled to a suspension arm as part of a head gimbal assembly (HGA). The HGA is suspended from an actuator arm. The actuator arm has a motor that moves the slider across the disk surface. The sliders contain hydrodynamic features that create an air bearing between the slider and the rotating disk. The air bearing prevents mechanical wear between the disk surface and the slider.

The height of the air bearing is a critical parameter that can affect the lift and performance of the entire disk drive. Therefore, it is desirable to measure the height of the air bearing before installing the HGA into a disk drive assembly. The air bearing height can be measured with an apparatus commonly referred to as a flying height tester (FHT). An FHT contains a loader which places the slider adjacent to a rotating transparent substrate. The slider is separated from the rotating substrate by an air bearing. A light beam is directed through the substrate and reflected off the slider. The reflected light beam creates an interference pattern that is detected by a detector. A computer then computes the height of the air bearing from the detected interference pattern.

FIG. 1 illustrates a typical slider 2. The slider 2 has an air bearing surface (ABS) 4 that is typically constructed from an $Al_2O_3$—TiC material. Extending from the air bearing surface 4 is a trailing edge 6 that contains the read/write elements 8 of the slider 2. The read/write elements 8 are typically embedded within a layer of $Al_2O_3$ that is subsequently shaped with a lapping process. The lapping process may create a recession h between the air bearing surface 4 and the trailing edge 6.

To more accurately determine the reliability of a slider, it is desirable to measure the minimum air bearing height between the slider and the substrate. Flying height testers typically measure the air bearing height between the air bearing surface 4 and the substrate. Because of the recession h and the angular pitch of the flying slider, the measured air bearing height may not be the minimum air bearing height. It is thus desirable to measure the actual depth of the recession h, which can subsequently be used to calculate the minimum air bearing height.

The depth of the recession h is typically measured with a stylus or optical profilometer. The stylus includes a mechanical probe for measuring the surface profile of the slider. Such a mechanical probe may cause undesirable material deformation when dragged across the slider surface. Profilometers, such as atomic force microscopes or interferometers, require the use of additional equipment and test stations which increase the cost of testing and producing hard disk drives.

In addition, "phase shift" interferometers, such as that shown in FIG. 2, are used to provide the surface topography of sliders. In particular, "phase shift" interferometers provide interference fringes which are produced by the interference between light reflected from a reference surface and a surface of interest. A light beam 10 is directed by a partial reflection mirror 12 towards a lens system 14, which focuses the light beam 10 through another partial reflection mirror 16 onto the surface 18 of interest. Interference fringes are produced by the interference between light reflected from the surface 18 and a reference mirror 20 situated between the lens system 14 and the partial reflection mirror 16. The interference fringes are detected by a CCD detector 26.

An interference filter 22 is also typically provided to filter the light beam directed towards the optical system 24. By varying the distance between the optical system 24 and the detector 26, the interference fringes are "phase shifted". The CCD detector 26 is used to capture several images of the fringes which are "phase shifted" with respect to each other. With a known amount of phase shift between several images, the topography of the surface of interest may be determined.

It has been found that such conventional interferometers provide a major disadvantage when used with surfaces that are non-homogenous. This is because the interference pattern is a function of the index of refraction n and the extinction coefficient k of a surface. Thus, the phase shift of light upon reflection off a surface is a function of the material of the surface. In particular, non-dielectric materials generally induce different phase shifts in reflected light as compared to dielectric materials. Thus, surfaces composed of an amalgam of different materials may induce different phase shifts on light that is reflected. As a result, the use of conventional interferometers does not enable the operator to distinguish different topography values based on the different phase shift values obtained when light is reflected from different materials. For example, because light reflected from a metal has a larger phase shift when compared to light reflected from a ceramic, a flat surface comprising a metal sandwiched between two ceramic pieces would appear to have a surface topography with a recessed region representative of the metal portion. This would result in an erroneous analysis of the topography of the flat surface.

Recent advances in interferometer design has resulted in phase shift interferometers which permit a user to enter representative phase shift values to compensate for variations in the real index of refraction n and extinction coefficient k of the surface under inspection. However, since the phase shift values are only representative, and not actual, various inaccuracies result. Moreover, any variation in n and k will degrade the accuracy of the test results. To improve the accuracy of such interferometers, the surfaces under inspection are typically measured with an ellipsometer to determine the real index of refraction n and extinction coefficient k. The measured n and k values are then manually entered into the computer of the interferometer to be used in computing the surface topography. However, by separately measuring the n and k values, the time required to map the surface topography increases.

It would therefore be desirable to provide an interferometer that can measure n and k values so that the topography of a surface of interest may be efficiently and accurately provided.

SUMMARY OF THE INVENTION

An apparatus and method for measuring the topographic profile of a reflective member having an index of refraction. The apparatus comprises a first optical system that reflects a light beam from the reflective member and detects the reflected light beam. A second optical system directs the light beam to interfere with the reflected light beam and detects the resulting interference pattern. A processor coupled to the first optical system and the second optical system computes the index of refraction of the reflective member from the detected reflected light beam and provides the topographic profile of the reflective member from the index of refraction and the interference pattern.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3A is an enlarged, front elevational view of one embodiment of the adjustable polarizer 144 of FIG. 3.

DETAILED DESCRIPTION OF THE INVENTION

Figure 1:
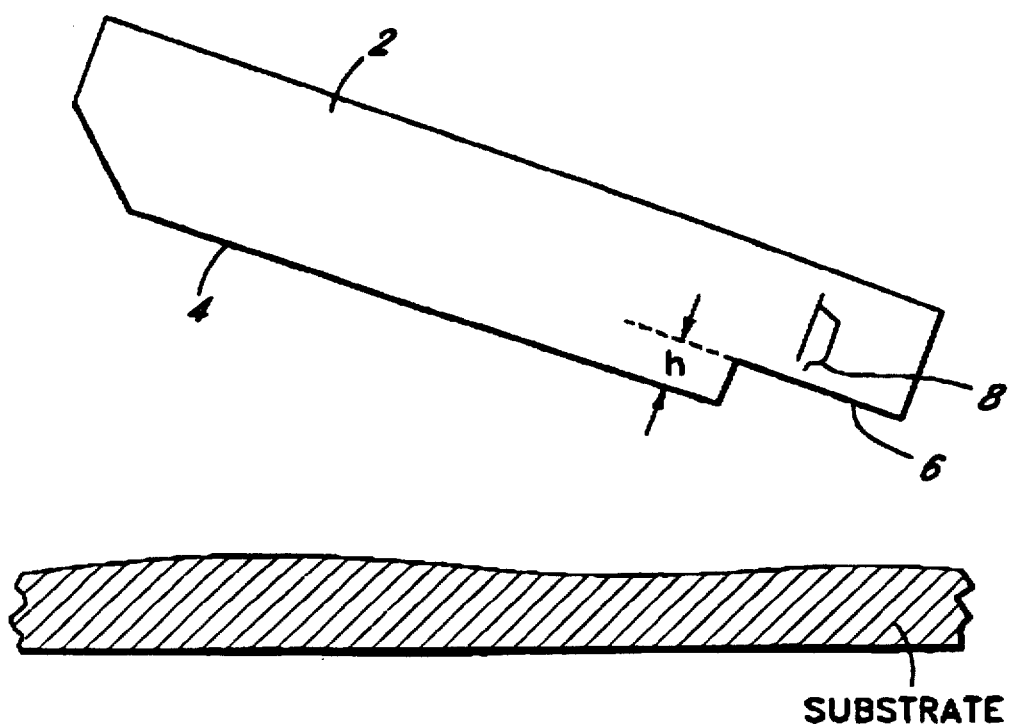
FIG. 1 is a schematic of a slider/substrate interface of the prior art.
Figure 2:
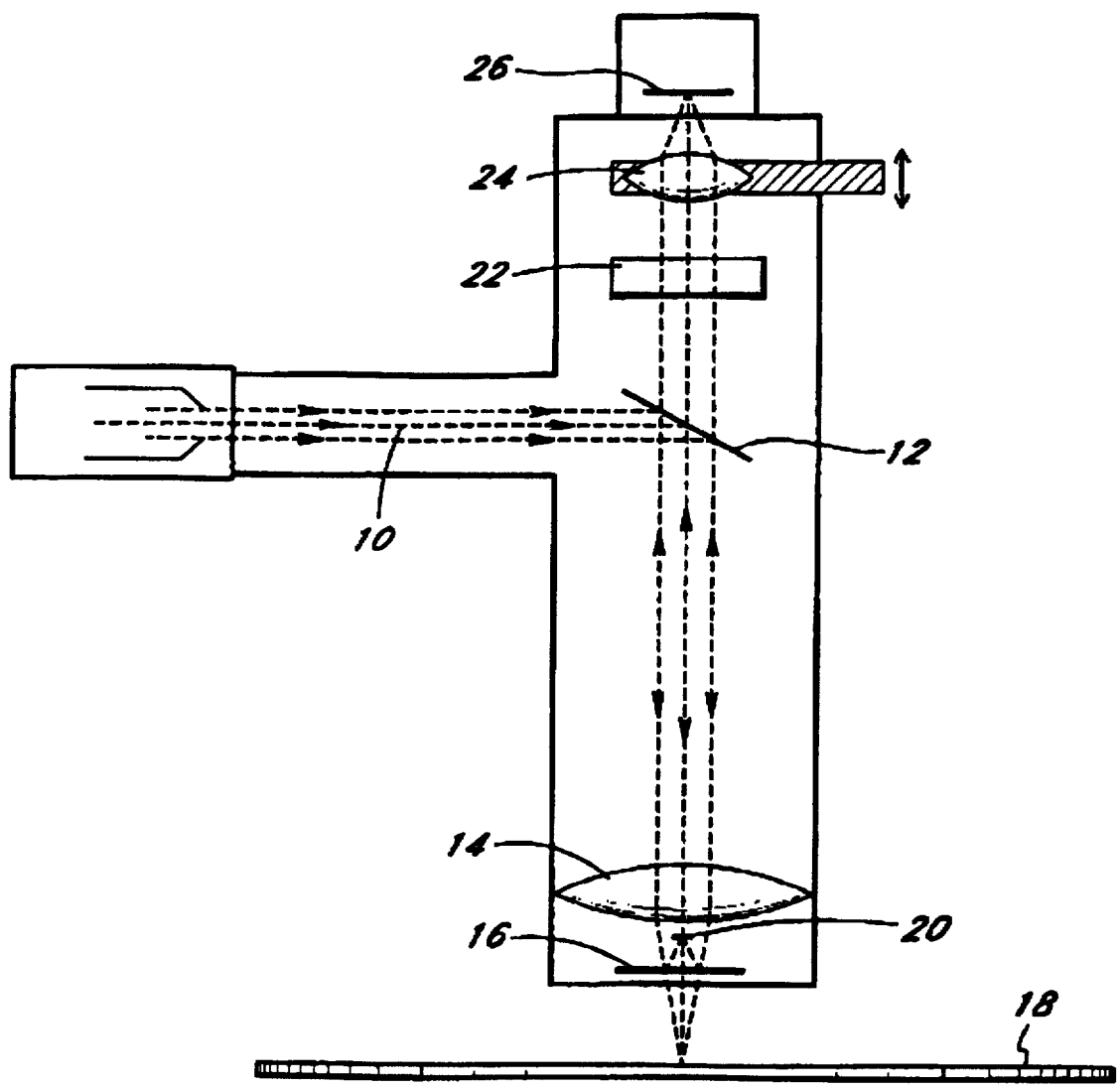
FIG. 2 is a schematic view of an interferometer of the prior art.
Figure 3:
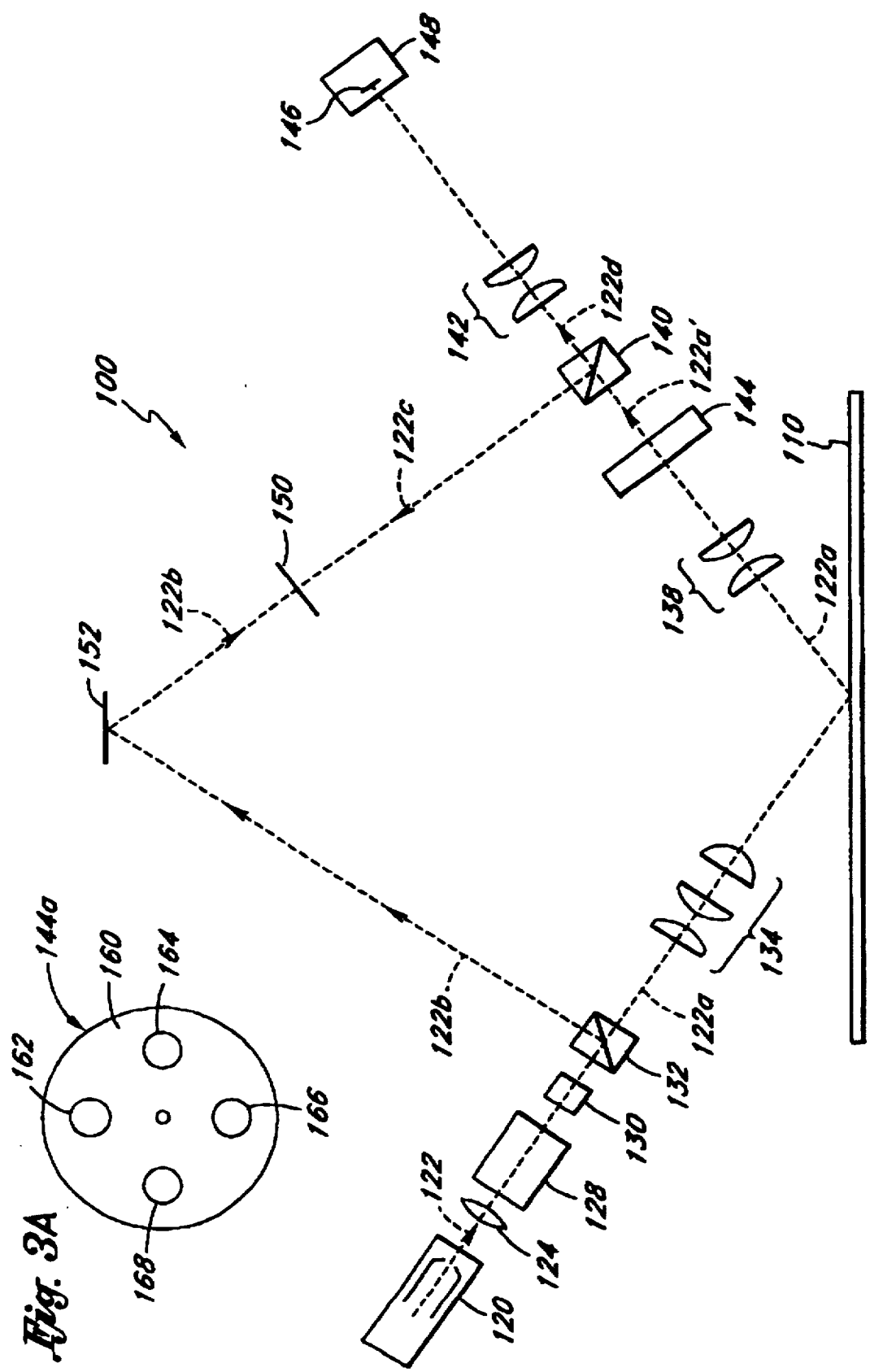
FIG. 3 is a schematic of the detection system of the present invention.

Referring to the drawings more particularly by reference numbers, FIG. 3 shows a detection system 100 of the present invention. The detection system 100 is used to measure the surface topography of a reflective member or substrate 110. Examples of the substrate 110 includes a slider and a disk. The system 100 includes a light source 120 which emits a beam of light 122. In the preferred embodiment, the light source 120 is a quartz halogen lamp. The light beam 122 is directed through a condenser assembly 124, a crystal polarizer 128 and a quarter waveplate retarder 130. The polarizer 128 polarizes the light beam and the quarter waveplate 130 retards a polarized component to produce a circularly polarized light beam. Although a separate polarizer 128 and quarter waveplate 130 are shown and described, it is to be understood that other elements for circularly polarizing the light may be employed. Additionally, although circularly polarized light is discussed, the present invention may use a light beam polarized in another manner, such as 45° linearly polarized light. Additionally, a laser source may be used.

As shown in FIG. 3, the circularly polarized light beam 122 is directed through a beam splitter 132 which splits the beam 122 into two portions 122a and 122b. The first portion of the beam 122a is directed through lenses 134 and then onto the substrate 110. In the preferred embodiment the polarized light beam has an angle of incidence of approximately 60°. The light beam 122 reflects off of the substrate 110 and back towards lenses 138. The substrate 110 has a complex index of refraction which is the summation of the real index of refraction n and the extinction coefficient k. The second portion of the light beam 122b is directed towards a reference mirror 152, which reflects the light beam 122b towards the beamsplitter 140 when the shutter 150 is open.

The first portion of the reflected light beam 122a first travels through lenses 138 and then through an adjustable polarizer or phase shifter 144 to provide a polarized light beam 122a'. The adjustable polarizer or phase shifter 144 comprises a disk 144a having four filters 162, 164, 166 and 168 as shown in FIG. 3A. In one embodiment, the filter 162 is a horizontal polarizer, while filter 164, filter 166 and filter 168 is a vertical polarizer, a 45° polarizer and a right circular polarizer, respectively. In another embodiment, the adjustable polarizer 144 is a liquid crystal device capable of both polarization and retardation. The polarized light beam 122a' is then split into two light beams 122c and 122d by a beam splitter 140 which reflects a portion 122c of the reflected light and transmits a portion 122d of the light. The intensity of the polarized light beam 122d is then detected by a charged coupled device 146 located within camera 148. The CCD device 146 converts the light energy of the beam 122d into an electrical signal. The electrical signal is provided to a processor that is coupled to the camera 148.

When operating as an interferometer, the shutter 150 is opened to permit interference of the beam 122b with the beam 122d. The interference pattern obtained from interference between the two beams 122b and 122d is detected by the CCD device 146 located in camera 148. To obtain interference fringes with phase shifts, the reference mirror 152 may be moved with an actuator such as a piezo-electric transducer, so that the optical path of the beam 122b may be varied. Optionally, if the adjustable polarizer 144 is a device capable of phase retardation such as a liquid crystal device, then the adjustable polarizer 144 may be used to phase-shift the interference pattern.

In operation, the shutter 150 is first closed to enable operation of the detection system 100 as a polarimeter. The adjustable polarizer 144 is rotated so that the light beam 122d is directed through each one of the four filters 162, 164, 166 and 168 to provide four states of polarization respectively, which in turn provides four intensity values $I_n$, where n=1, 2, 3 or 4, for each pixel on the detector array in the CCD device 146. Each intensity value provides an electrical detection signal defined by the following equation.

$$Ji=(J_1, J_2, J_3, J_4)^T$$

where:

$Ji=CiIi$ $Ci$=the sensitivity of the detector. $Ii$=the intensity of the light beams.

From the detection signal, the Stokes parameters Si representing the polarization of the light reflected from the slider can be computed using the following transformation matrix:

$Si=F^{-1}Ji$ where:

$F^{-1}=$ is a matrix characteristic of the polarimeter.

From the Stokes parameters the ellipsometric parameters delta ($\Delta$) and psi ($\Psi$) can be calculated using the equations:

$$\tan\Psi = \left[ \frac{S_0 - S_1}{S_0 + S_1} \right]^5$$

$$\tan\Delta = \frac{S_2}{S_3}$$

where:

$S_0, S_1, S_2, S_3$=the Stokes parameters.

The two known values are used to compute the two unknown values: n and k, since the ellipsometric parameters delta $\Delta$ and psi $\Psi$ are a function of the real index of refraction n and the extinction coefficient k. In particular, $$n^2(1 - k^2) = \sin^2\theta_i \left\{ 1 + \frac{\tan^2\theta_i(\cos^2 2\Psi - \sin^2 2\Psi \sin^2\Delta)}{(1 + \sin 2\Psi \cos\Delta)^2} \right\},$$

and $$2n^2k = \frac{\sin^2\theta_i \tan^2\theta_i \sin 4\Psi \sin\Delta}{(1 + \sin 2\Psi \cos\Delta)^2}$$

where $\theta_i$ is the principle angle of incidence.

Next, the shutter 150 is opened to permit interference of the beam 122b with the beam 122d. The interference pattern obtained from interference between the two beams 122b and 122d is detected by the CCD device 146 located in camera 148. Based on the n and k values and the interference pattern thus obtained, a processor (not shown) coupled to the camera 148 can determine the surface topography of the substrate 110. Sufficient data across the surface of the substrate 110 may be obtained by taking measurements while moving the substrate 110 along an axis parallel to the surface of the substrate 110 or by taking measurements while moving the detection system 100 over the substrate 110. An exemplary procedure for measuring the topography of the surface based on the n and k values and the interference pattern thus obtained is described by James C. Wyant in "Computerized Interferometric Measurement of Surface Microstructure" James C. Wyant, SPIE Vol. 2576, p. 122–130, which is incorporated herein by reference.

The instrument characteristic matrix $F^{-1}$ used to determine the Stokes vectors from the measured intensities is a 4 by 4 matrix that contains 16 unknowns. The system 100 must be calibrated to determine the unknowns. The system 100 may be calibrated by measuring the polarization and transmittance of the four filters in the adjustable polarizer 144 so as to compute the unknowns of the instrument characteristic matrix $F^{-1}$. Alternatively, the system 100 may be calibrated by inserting four or more known polarization states of light into the system 100. The system 100 may also be calibrated by directing the light beam 122 onto a calibration medium 160 to compute the unknowns of the instrument characteristic matrix $F^{-1}$.

Figure 4:
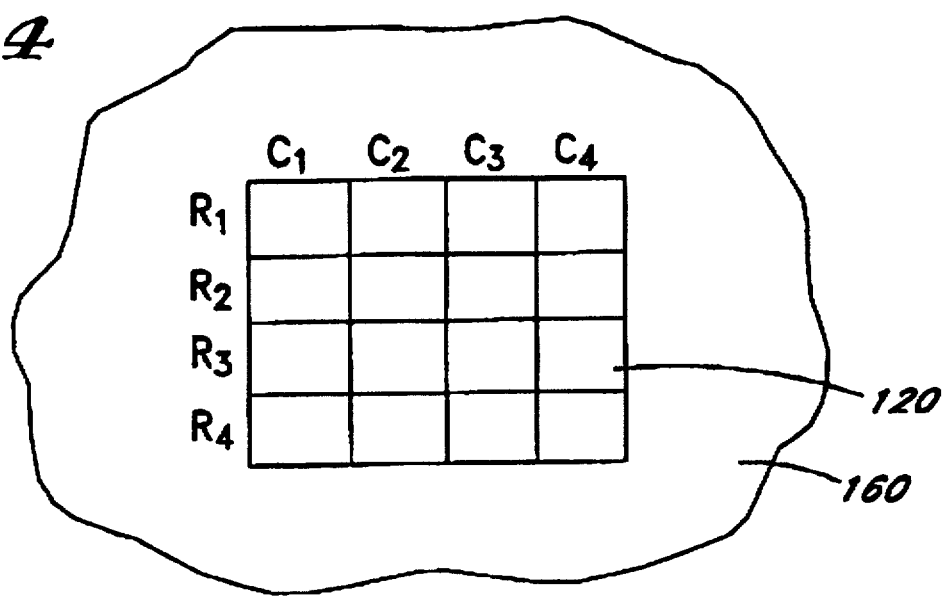
FIG. 4 is a top view of a calibration medium for the detection system of FIG. 3.

As shown in FIG. 4 the medium 160 may contain 16 different ridges 162 arranged into four different rows R1–4 and four different columns C1–4. Each ridge 162 has a different height. The ridges 162 can be constructed with a first coating of a metal oxide with an index of refraction of 2 at 550 nm. In the preferred embodiment the first coating is a compound sold by Merck under the part designation H4. A second coating is then applied to the first coating. The second coating may be silicon dioxide SiO2 which has an index of refraction of 1.46.

The medium 160 may be constructed with 5 separate coating steps. The first coating is initially applied by covering a different column of the array. The first column C1 has no coating. The second column C2 is coated with H4 to a thickness of 47.5 nm, the third column C3 is coated to a thickness of 69.5 nm and the fourth column C4 is coated to a thickness of 94 nm. The second coating is then applied to the array. The first row R1 is not coated. The second row R2 is coated with 127 nm of SiO2 and the fourth row R4 is coated with 60 nm of SiO2. The third row R3 is coated during the coating of rows R2 and R4 for a SiO2 thickness of 187 nm.

The system 100 is calibrated by directing the light beam 122 through each ridge and measuring intensities of the four beams corresponding to light passing through the filters 162, 164, 166 and 168. Measurements for all 16 ridges are stored to compute the 16 unknowns of the instrument characteristic matrix. An instrument characteristic matrix is computed for each pixel of the two dimensional detector array and stored into the computer. The optical system can be mounted to a gantry which can move the light beam 122 onto the ridges of the medium 160.

The detection system of FIG. 3 may be used to determine the n and k values of a substrate that has a coating. In particular, it is possible to extract the optical constants from ellipsometric data by comparison with a suitable model of overlayers on a substrate. Examples are provided by R. M. A. Azzam and N. M. Bashara as described in "Ellipsometry and Polarized Light", North Holland Physics Publishing, 1977.

Figure 5:
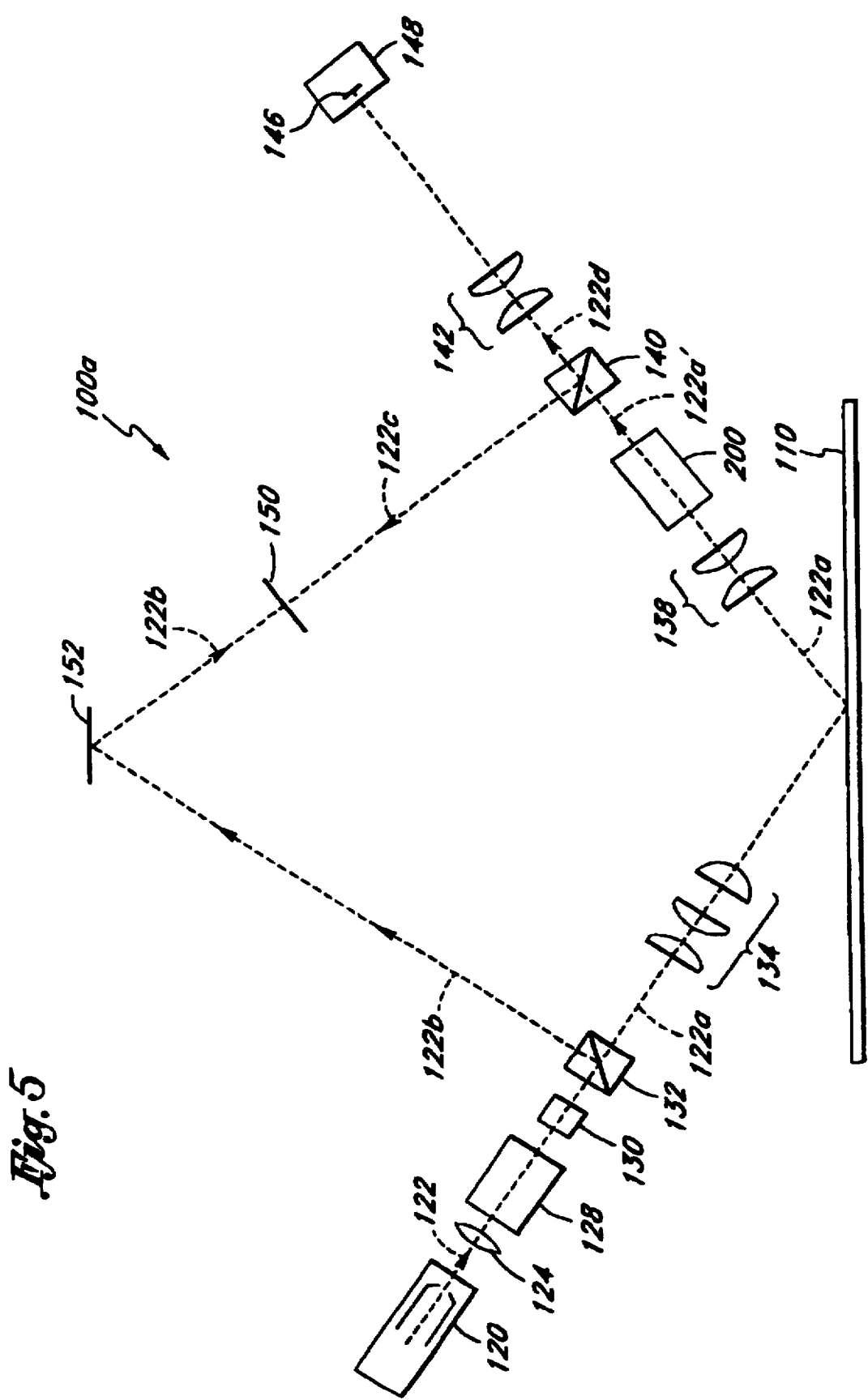
FIG. 5 is a schematic of an alternate embodiment of the detection system of the present invention.

FIG. 5 shows an alternate embodiment of a system 100a used to measure the surface topography of a reflective member or substrate 110. The detection system 100a is identical to the detection system 100 of FIG. 3, with the exception of the use of a liquid crystal optical element 200, which may replace the adjustable polarizer 144, located between the lenses 138 and beamsplitter 140. The liquid crystal optical element 200 is used to shift the optical path of the light 122a, so that the interference fringe may be "phase shifted" using the liquid crystal when shutter 150 is open.

In operation, the present invention includes a first optical system that reflects a light beam from the reflective member and detects the reflected light beam to provide the real index of refraction n and the extinction coefficient k of the reflective member. A second optical system directs the light beam to interfere with the reflected light beam and detects the resulting interference pattern. The second optical system includes a shutter which is closed when the n and k measurements of the reflective member are being taken, and open when the interference pattern is obtained. Based on the n and k values obtained, and the interference patterns detected, the topographic profile of the surface of interest is obtained. What is thus provided is an optical system for accurately measuring the topography of a surface by measuring and compensating for the variation of optical properties on the surface.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for measuring a topographic profile of a reflective member having an index of refraction, comprising:

a first optical system that reflects a light beam from the reflective member and detects the reflected light beam;

a second optical system that directs the light beam to interfere with the reflected light beam and detects the resulting interference pattern; and a processor that computes the index of refraction of the reflective member from the detected reflected light beam and provides the topographic profile of the reflective member from the index of refraction and the interference pattern.

2. The apparatus as recited in claim 1, wherein said first optical system directs the reflected light beam through a first filter, a second filter, a third filter and a fourth filter to provide a first filtered reflected light beam, a second filtered light beam, a third filtered light beam and a fourth filtered light beam that are detected.

3. The apparatus as recited in claim 2, wherein said processor computes a first stokes parameter, a second stokes parameter, a third stokes parameter, and a fourth stokes parameter from the first, the second, the third and the fourth reflected light beams and computes the index of refraction from said first, second, third and fourth stokes parameters.

4. The apparatus as recited in claim 2, wherein said processor computes a pair of ellipsometric parameters from the first, second, third and fourth stokes parameters.

5. The apparatus as recited in claim 2, wherein said processor computes a real index of refraction and an extinction coefficient from the first, second, third and fourth stokes parameters.

6. The apparatus as recited in claim 1, wherein said first optical system includes an optoelectronic detector array that provides an image of the reflective member.

7. The apparatus as recited in claim 1, further comprising a calibration medium, wherein said first optical system is calibrated by reflecting the light beam from said calibration medium.

8. The apparatus as recited in claim 1, wherein the second optical system comprises a shutter that opens to direct the light beam to interfere with the reflected light beam.

9. A method for measuring a topographic profile of a reflective member having an index of refraction, comprising the steps of:

a) reflecting a light beam from the reflective member;

b) detecting the reflected light beam;

c) interfering the light beam with the reflected light beam;

d) detecting an interference pattern; and e) computing the index of refraction from the detected reflected light beam;

f) providing the topographic profile of the reflective member based on the index of refraction and the interference pattern.

10. The method as recited in claim 9, further comprising the steps of directing the reflected light beam through a first filter, a second filter, a third filter and a fourth filter to provide a first filtered reflected light beam, a second filtered light beam, a third filtered light beam and a fourth filtered light beam respectively, and detecting the four filtered light beams.

11. The method as recited in claim 10, further comprising the steps of computing a first stokes parameter, a second stokes parameter, a third stokes parameter, and a fourth stokes parameter, and computing the optical property from the first, second, third and fourth stokes parameters.

12. The method as recited in claim 10, further comprising the step of computing a pair of ellipsometric parameters from the first, second, third and fourth stokes parameters.

13. The method as recited in claim 12, further comprising the step of computing a real index of refraction and an extinction coefficient from the ellipsometric parameters.

14. The method as recited in claim 9, wherein the reflected light beam provides an image of the reflective member.

* * * * *